US009841629B2

(12) United States Patent
Chen et al.

(10) Patent No.: US 9,841,629 B2
(45) Date of Patent: Dec. 12, 2017

(54) DISPLAY PANEL AND DISPLAY DEVICE

(71) Applicant: Innolux Corporation, Miao-Li County (TW)

(72) Inventors: Yu-Ju Chen, Miao-Li County (TW); I-Hua Huang, Miao-Li County (TW); Wan-Shan Yang, Miao-Li County (TW); Chun-Teng Chen, Miao-Li County (TW); Chen-Kuan Kao, Miao-Li County (TW); Hsu-Kuan Hsu, Miao-Li County (TW); Hsia-Ching Chu, Miao-Li County (TW); Kuei-Ling Liu, Miao-Li County (TW); Fu-Cheng Chen, Miao-Li County (TW); Kuo-Hao Chiu, Miao-Li County (TW); Chu-Chun Cheng, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 183 days.

(21) Appl. No.: 15/016,364

(22) Filed: Feb. 5, 2016

(65) Prior Publication Data
US 2016/0154260 A1 Jun. 2, 2016

Related U.S. Application Data

(63) Continuation-in-part of application No. 14/315,374, filed on Jun. 26, 2014, now Pat. No. 9,291,869, and (Continued)

(30) Foreign Application Priority Data

Jan. 15, 2014 (TW) .............................. 103101396 A
Jun. 4, 2014 (TW) .............................. 103119348 A

(51) Int. Cl.
G02F 1/1337 (2006.01)
G02F 1/1339 (2006.01)
(Continued)

(52) U.S. Cl.
CPC .......... *G02F 1/1337* (2013.01); *G02F 1/1339* (2013.01); *G02F 1/13392* (2013.01);
(Continued)

(58) Field of Classification Search
CPC combination set(s) only.
See application file for complete search history.

(56) References Cited

U.S. PATENT DOCUMENTS 5,739,888 A * 4/1998 Ogura ................... G02F 1/1339
349/110
6,480,255 B2 11/2002 Hoshino et al.
(Continued)

FOREIGN PATENT DOCUMENTS

| JP | 2000194013 A | 7/2000 |
|----|--------------|--------|
| TW | 200611042 A | 4/2006 |

(Continued)

OTHER PUBLICATIONS

TW Office Action dated Jul. 16, 2015 in corresponding Taiwan application (No. 102130893).
(Continued)

*Primary Examiner* — Wen-Ying P Chen
(74) *Attorney, Agent, or Firm* — McClure, Qualey & Rodack, LLP

(57) ABSTRACT

A display panel and a display device are provided. The display panel includes a first substrate having a display region and a non-display region, a second substrate disposed opposite to the first substrate, at least a data line and at least a scan line disposed in the display region, a liquid crystal layer, a plurality of spacers and a seal disposed between the (Continued)

first substrate and the second substrate, a light shielding layer disposed between the first substrate and the second substrate, and including a light transmitting portion and a light shielding portion, and an alignment layer and a plurality of particles disposed on the light transmitting portion and the light shielding portion. A first surface roughness corresponding to the light transmitting portion of the non-display region is greater than a second surface roughness corresponding to the light shielding portion of the non-display region.

20 Claims, 10 Drawing Sheets

Related U.S. Application Data a continuation-in-part of application No. 14/592,926, filed on Jan. 9, 2015.

(51) Int. Cl.
*G02F 1/1333* (2006.01)
*G02F 1/1362* (2006.01)
*G02F 1/1335* (2006.01)
*G02F 1/137* (2006.01)

(52) U.S. Cl.
CPC .... *G02F 1/13394* (2013.01); *G02F 1/133512* (2013.01); *G02F 1/133753* (2013.01); *G02F 1/136209* (2013.01); *G02F 1/136286* (2013.01); *G02F 1/133707* (2013.01); *G02F 1/133788* (2013.01); *G02F 2001/13396* (2013.01); *G02F 2001/13775* (2013.01); *G02F 2001/133388* (2013.01); *G02F 2001/133776* (2013.01); *G02F 2202/36* (2013.01)

(56) References Cited

U.S. PATENT DOCUMENTS

| 7,643,108 | B2 | 1/2010 | Huang et al. |
| 8,072,562 | B2 | 12/2011 | Hsu et al. |
| 2001/0050747 | A1 | 12/2001 | Hoshino et al. |
| 2002/0101558 | A1 | 8/2002 | Nemeth |
| 2005/0117093 | A1 | 6/2005 | Kim et al. |
| 2007/0153167 | A1* | 7/2007 | Jang .................. G02F 1/133512 349/110 |
| 2008/0252807 | A1 | 10/2008 | Huang et al. |
| 2010/0188623 | A1 | 7/2010 | Nakagawa |
| 2011/0141413 | A1 | 6/2011 | Sakai et al. |
| 2011/0304526 | A1 | 12/2011 | Itoh |

FOREIGN PATENT DOCUMENTS

| TW | 200717093 | A | 5/2007 |
| TW | 200841103 | | 10/2008 |
| TW | 200841103 | A | 10/2008 |
| TW | 201011420 | | 3/2010 |

OTHER PUBLICATIONS

Hanaoka, et al.: "40.1: A New MVA-LCD by Polymer Sustained Alignment Technology"; SID 04 Digest; Copyright 2004; pp. 1200-1203.
EP Search Report dated Apr. 8, 2014.
KIPO Office Action dated Nov. 18, 2015 in corresponding application {No. 10-2015-0006339).
TIPO Office Action dated Oct. 26, 2015 in corresponding Taiwan application {No. 103119348).
TW Office Action dated Jun. 22, 2015 in corresponding Taiwan application (No. 103101396).
Partial EP Search report dated Jul. 22, 2014.
EP Search report dated Nov. 10, 2014.

* cited by examiner

DISPLAY PANEL AND DISPLAY DEVICE

This is a continuation-in-part application of application Ser. No. 14/315,374, filed Jun. 26, 2014, and a continuation-in-part application of application Ser. No. 14/592,926, filed Jan. 9, 2015. The disclosure of which is incorporated herein by reference. Applicant Ser. No. 14/315,374 claims the benefit of Taiwan application Serial No. 102130893, filed Aug. 28, 2013, the subject matter of which is incorporated herein by reference. Applicant Ser. No. 14/592,926 application claims the benefits of Taiwan application Serial No. 103101396, filed Jan. 15, 2014, and Taiwan application Serial No. 103119348, filed Jun. 4, 2014. The subject matter of all priority documents is incorporated herein by reference.

BACKGROUND

Field of the Invention

The disclosure is related in general to a display panel and a display device, and particularly to a display panel and a display device having better display qualities.

Description of the Related Art

Liquid crystal displays have been widely applied in a variety of electronic products, such as laptops, tablet PCs, and etc. Moreover, along with the rapid advance of large-sized flat panel displays in the market, liquid crystal displays with light weight and miniaturized sizes have played very important roles and gradually replaced CRT displays to become the main stream in the market.

Currently, vertical alignment liquid crystal display panels are one of the main stream products. However, vertical alignment liquid crystal display panels have issues of light leakage, which affect the display quality thereof. Therefore, researchers have been working on providing vertical alignment liquid crystal display panels having superior display quality.

SUMMARY

The disclosure is directed to a display panel and a display device. In the embodiments, the particles located corresponding to the non-display region of the display panel do not have any specific alignment direction, such that the liquid crystals in the region do not tilt toward any specific direction, and the light transmittance of the non-display region is lowered; accordingly, the light leakage of the display panel is reduced, and the qualities of the display images are improved.

According to an embodiment of the present disclosure, a display panel is provided. The display panel includes a first substrate, a second substrate, at least a data line, at least a scan line, a liquid crystal layer, a plurality of spacers, a seal, a light shielding layer, an alignment layer, and a plurality of particles. The second substrate is disposed opposite to the first substrate, and the first substrate has a display region and a non-display region located outside the display region. The data line and the scan line are disposed in the display region. The liquid crystal layer is disposed between the first substrate and the second substrate. The spacers are disposed between the first substrate and the second substrate. The seal is disposed between the first substrate and the second substrate. The light shielding layer is disposed between the first substrate and the second substrate, and includes a light transmitting portion and a light shielding portion. The alignment layer and the particles are disposed on the light transmitting portion and the light shielding portion. A first surface roughness corresponding to the light transmitting portion is greater than a second surface roughness corresponding to the light shielding portion.

According to another embodiment of the present disclosure, a display device is provided. The display device includes a display panel. The display panel includes a first substrate, a second substrate, at least a data line, at least a scan line, a liquid crystal layer, a plurality of spacers, a seal, a light shielding layer, an alignment layer, and a plurality of particles. The second substrate is disposed opposite to the first substrate, and the first substrate has a display region and a non-display region located outside the display region. The data line and the scan line are disposed in the display region. The liquid crystal layer is disposed between the first substrate and the second substrate. The spacers are disposed between the first substrate and the second substrate. The seal is disposed between the first substrate and the second substrate. The light shielding layer is disposed between the first substrate and the second substrate, and includes a light transmitting portion and a light shielding portion. The alignment layer and the particles are disposed on the light transmitting portion and the light shielding portion. A first surface roughness corresponding to the light transmitting portion is greater than a second surface roughness corresponding to the light shielding portion.

The above and other aspects of the disclosure will become better understood with regard to the following detailed description of the preferred but non-limiting embodiment(s). The following description is made with reference to the accompanying drawings.

BRIEF DESCRIPTION OF THE DRAWINGS

FIG. 4-2 shows a cross-sectional view of a display panel according to another embodiment of the present disclosure;

DETAILED DESCRIPTION

Figure 1A:
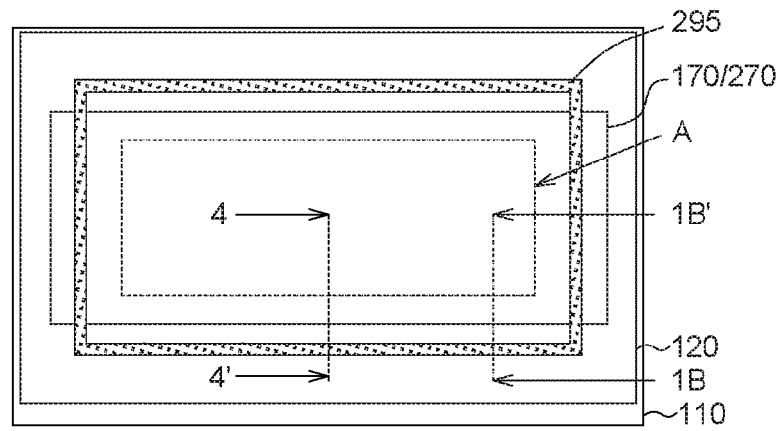
FIG. 1A shows a top view of a display panel according to an embodiment of the present disclosure.

According to the embodiments of the present disclosure, the particles located corresponding to the non-display region provide a better alignment function (ex. vertical alignment) for the liquid crystal molecules in the liquid crystal layer, such that recovery of the liquid crystal molecules is faster when the liquid crystal molecules are under external force operations, the light leakage is reduced, and hence the qualities of the display images are improved. The embodiments are described in details with reference to the accompanying drawings. The identical elements of the embodiments are designated with the same or similar reference numerals. Also, it is to be noted that the drawings may be simplified for illustrating the embodiments. Thus, the specification and the drawings are to be regard as an illustrative sense rather than a restrictive sense. The details of the structures of the embodiments are for exemplification only, not for limiting the scope of protection of the disclosure. Detailed structures may be modified or changed by one skilled in the art after having the benefit of this description of the disclosure.

Figure 1B:
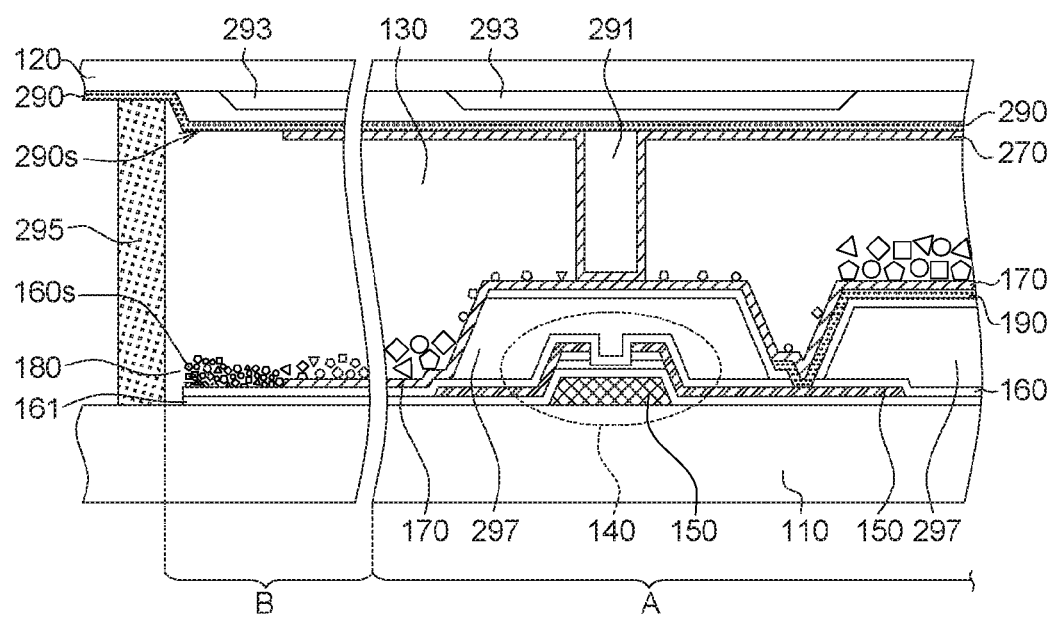
FIG. 1B shows a cross-sectional view along the cross-sectional line 1B-1B' of FIG. 1A.

FIG. 1A shows a top view of a display panel 100 according to an embodiment of the present disclosure, and FIG. 1B shows a cross-sectional view along the cross-sectional line 1B-1B' of FIG. 1A. Referring to FIGS. 1A-1B, the display panel 100 includes a first substrate 110, a second substrate 120, a liquid crystal layer 130, a plurality of thin film transistors 140, a plurality of metal wires 150, at least a protection layer (e.g. a first protection layer 160 and a second protection layer 161), a first alignment layer 170, and a plurality of particles 180. In the embodiments, the particles 180 may be agglomerates, polymer particles or agglomerate polymer particles. The first substrate 110 has at least a display region A and a non-display region B located outside the display region A. The second substrate 120 is disposed opposite to the first substrate 110. The liquid crystal layer 130 is disposed between the first substrate 110 and the second substrate 120. The thin film transistors 140 and the metal wires 150 are disposed on the first substrate 110. The first protection layer 160 and the second protection layer 161 overlay at least a portion of the metal wires 150. The first protection layer 160 is disposed on the second protection layer 161, and the first protection layer 160 covers the thin film transistors 140 and the metal wires 150. The first alignment layer 170 is disposed on the first protection layer 160, and the first alignment layer 170 partially covers the first protection layer 160 for exposing a first surface 160s of the first protection layer 160. The particles 180 are disposed on at least a portion of the first surface 160s. In another embodiment, the first protection layer 160 partially covers the second protection layer 161 for exposing a partial surface of the second protection layer 161, and the particles 180 are disposed on at least the exposed partial surface (not shown) of the second protection layer 161. In a further embodiment, the first protection layer 160 partially covers the second protection layer 161 for exposing a partial surface (not shown) of the second protection layer 161, and the particles 180 are disposed on the first protection layer 160 and on the exposed partial surface of the second protection layer 161.

The display region A represents the area of the display panel 100 for displaying images, and the non-display region B represents the area not for displaying images. In an embodiment, as shown in FIG. 1A, the non-display region B surrounds the display region A. In the embodiment, the display region A includes at least one pixel area, and is used for displaying images, and the non-display region B is such as a fan out area or wiring area, but not limited thereto. The non-display region B may include any area not for displaying images.

In the embodiment, the first protection layer 160 is in direct contact with at least one of the thin film transistors 140 or the metal wires 150. As shown in FIG. 1B, in the present embodiment, the first protection layer 160 is in direct contact with the thin film transistors 140 and the metal wires 150.

In the embodiment, the first protection layer 160 and the second protection layer 161 may independently include an inorganic dielectric material, such as $SiN_x$, $SiO_x$, and/or $SiO_xN_y$. As shown in FIG. 1B, the first surface 160s of the first protection layer 160, which is exposed from the first alignment layer 170, is corresponding to the non-display region B.

In the embodiment, the particles 180 in the non-display region B do not have any specific arrangement or alignment direction. In other words, the particles 180 are arranged irregularly above the first substrate 110. The particles 180 in the display region A have functions of specific alignment direction(s) for directing the liquid crystals to tilt toward specific direction(s). In the manufacturing process, the irradiation solidification processes may vary and an electrical field may be applied or not depending on the regions where the particles 180 are located; accordingly, the particles 180 with different functions may be formed in different regions. Therefore, the particles 180 located in the non-display region B provide a better vertical alignment for the liquid crystal molecules in the liquid crystal layer 130, such that recovery is faster when the liquid crystal molecules are under external force operations, the light leakage of the display panel 100 is reduced, and hence the qualities of the display images are improved.

In the embodiment, the particles 180 are in direct contact with the liquid crystal molecules in the liquid crystal layer 130. It is to be noted that the sizes and ratios of the particles 180 in the drawings may not be necessarily drawn to scale, that is, the drawings are to be regard as an illustrative sense for illustrating the embodiments rather than a restrictive sense.

In the embodiment, there may be a variety of ways to form the particles 180. For example, in an embodiment, UV curable monomers may be added in the process of forming the liquid crystal layer 130 or in the process of forming the first alignment layer 170, and then UV irradiation is performed from the first substrate 110 side or the from the second substrate 120 side, for forming the particles 180 on the first substrate 110 (that is, the at least a portion of the first surface 160s of the first protection layer 160 exposed form the first alignment layer 170) or on the first alignment layer 170. The material of the particles 180 formed from irradiation polymerization of UV curable monomers is polymer, and the reaction conditions may differ in different regions. In the embodiments, the sizes, the numbers, the roughness or the topography of the particles 180 in different regions may be controlled respectively by using a gray tone mask, which may be performed by changing the irradiation level, the time duration, the applied voltage level, or the combinations thereof.

In an embodiment, the display panel 100 is such as a nano-protrusion vertical aligned liquid crystal display panel, and the particles 180 and the nano-protrusion structures on the surface of the first alignment layer 170 may be formed from the same monomer raw materials. For example, the monomers in the display region A are polymerized with a continuously applied external electrical field to form alignment nano-protrusion structures; while monomers in the non-display region B are polymerized without applying any external electrical field to form the particles 180, which have no alignment function for directing specific tilt directions and are arranged irregularly. As such, the alignment nano-protrusion structures in the display region A may help the liquid crystal molecules to have specific alignment direction(s), and the particles 180 located in the non-display region B provide a better vertical alignment for the liquid crystal molecules in the liquid crystal layer 130, such that recovery of the liquid crystal molecules is faster when the liquid crystal molecules are under external force operations, the light leakage of the display panel 100 is reduced, and hence the qualities of the display images are improved.

The above-mentioned alignment nano-protrusion structures and the particles 180 may be formed by a variety of manufacturing methods. For example, the electrode may be patterned, such that the patterned electrode is not located on the area of the substrate corresponding to the non-display region B, and thus the monomers in the non-display region B are not influenced by the electrical field. Alternatively, a patterned mask may be used to cover the non-display region B while UV irradiation is performed with a continuously applied electrical field, and polymerization of the monomers in the non-display region B by UV irradiation is performed after the electrical field is removed.

As shown in FIG. 1B, in the embodiment, the display panel 100 may further include a plurality of photo spacers 291. The photo spacers 291 are disposed between the first substrate 110 and the second substrate 120 for providing a gap for disposing the liquid crystal layer 130. Different photo spacers 291 may have different heights for providing buffer when the panel is compressed.

In the embodiment, as shown in FIG. 1B, the display panel 100 may include an electrode layer 190 formed on at least a portion of the first substrate 110. The electrode layer 190 is such as a patterned electrode layer. As shown in FIG. 1B, the display panel 100 may further include another electrode layer 290 disposed on the second substrate 120. Moreover, the display panel 100 may further include a second alignment layer 270 disposed on the electrode layer 290, and a second surface 290s of the electrode layer 290 is exposed from the second alignment layer 270. The particles 180 may be further disposed on at least a portion of the second surface 290s, that is, the exposed second surface 290s of the electrode layer 290. In the embodiment, the electrode layer 290 on the second substrate 120 may be a patterned light-transmitting electrode layer or a full flat light-transmitting electrode layer, and the material of the electrode layer may be ITO or IZO.

In the embodiment, the first alignment layer 170 and the second alignment layer 270 may be, for example, polyimide (PI) films.

In the embodiment, as shown in FIG. 1B, the display panel 100 may further include a seal 295. The seal 295 is disposed between the first substrate 110 and the second substrate 120 and located in a periphery area of the non-display region B.

As shown in FIGS. 1A-1B, in the embodiment, the first alignment layer 170 does not fully cover the region within the seal 295. Compare to the case where the first alignment layer 170 fully covers the first substrate 110, and the whole seal 295 is adhered to the first alignment layer 170, due to the poor adhesion between the seal 295 and the first alignment layer 170, peelings of layers may easily occur. Accordingly to the embodiments of the present disclosure, since the first alignment layer 170 partially overlies above the first substrate 110, such that at least a portion of the seal 295 can be adhered to the material with a higher adhesion on the first substrate 110, as such, the peelings of layers of the display panel 110 can be reduced.

Under such circumstance, the particles 180 are also located on the first surface 160s of the first protection layer 160 exposed from the first alignment layer 170. The particles 180 located in the non-display region B provide a better vertical alignment for the liquid crystal molecules in the liquid crystal layer 130, such that recovery is faster when the liquid crystal molecules are under external force operations, the light leakage of the display panel 100 is reduced, and hence the qualities of the display images are improved.

In the embodiment, as shown in FIG. 1B, the display panel 100 may further includes a color filter layer 297 disposed on the first substrate 110. In an alternative embodiment, the color filter layer may also be disposed on the second substrate 120 (not shown).

Figure 2:
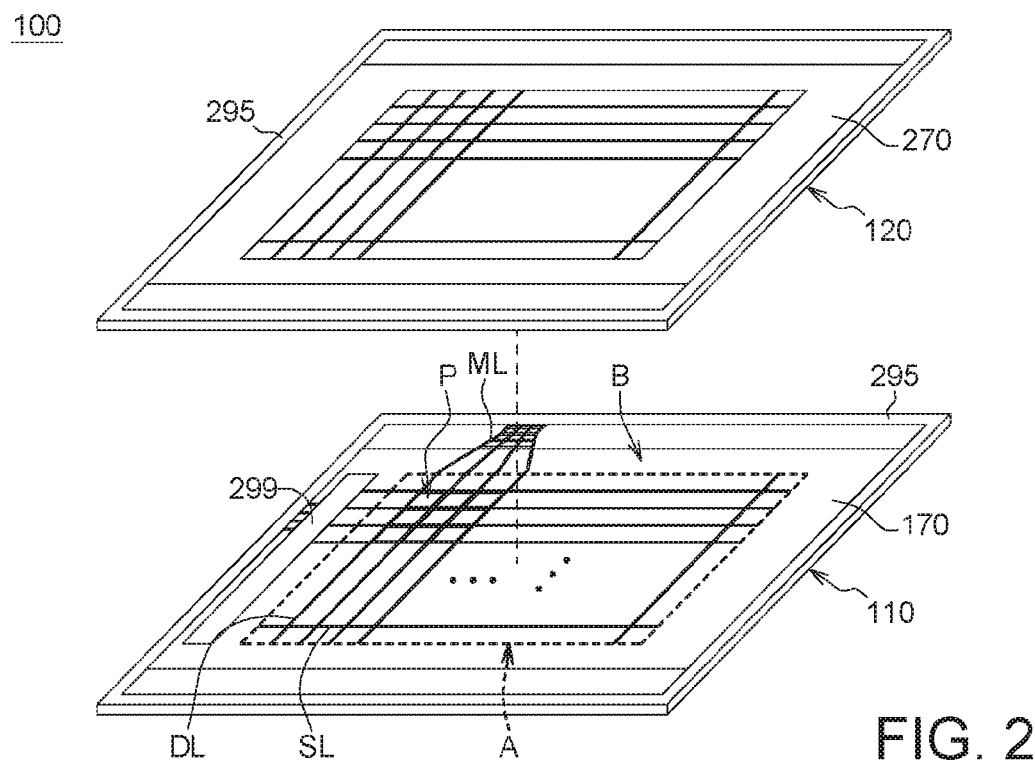
FIG. 2 shows a simplified explosion diagram of a display panel according to an embodiment of the present disclosure.

FIG. 2 shows a simplified explosion diagram of the display panel 100 according to an embodiment of the present disclosure. It is to be noted that some elements in FIG. 2 may be omitted or simplified for illustrating the embodiments, and the sizes and ratios of the elements in the drawings may not be necessarily drawn to scale, that is, the drawings are to be regard as an illustrative sense rather than a restrictive sense. In the present embodiment, the seal 295 is adjacent to (or aligned with) the sides of the substrates 110/120. In another embodiment, the seal 295 may not be necessarily adjacent to the sides of the substrates 110/120. Alternatively, the seal 295 may be only adjacent to three sides of the substrate 110 and not be adjacent to the last one side of the substrate 110.

Figures 1, 4:
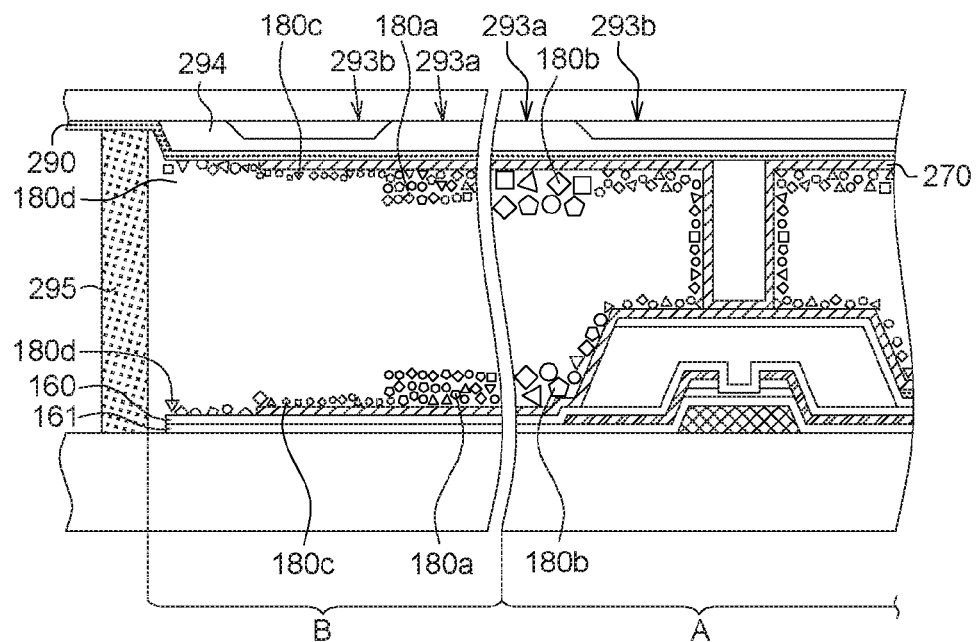
FIG. 4-1 shows a cross-sectional view of a display panel along the cross-sectional line 4-4' of FIG. 1A according to another embodiment of the present disclosure.
Figures 2, 4:
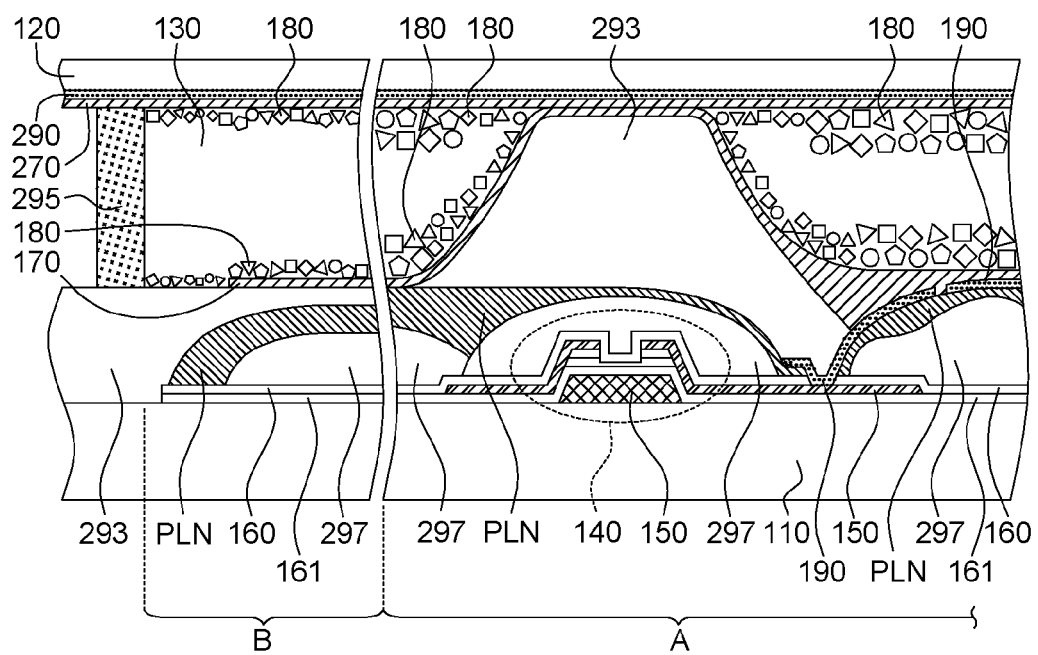

In the embodiment, the display panel 100 may further include at least a data line DL and at least a scan line SL. The display region A has a plurality of pixels P. The data lines DL and the scan line SL intersect to define the pixel areas. A plurality of metal wires ML are further disposed in the non-display region B, wherein some of the metal wires ML and the scan lines SL belong to the same layer of metal or are formed in the same manufacturing process, and some of the metal wires ML and the data lines DL belong to the same layer of metal or are formed in the same manufacturing process. Referring to FIGS. 1B and 2, some of the metal wires ML may be disposed below the second protection layer 161, and some of the metal wires ML may be disposed below the first protection layer 160. However, the arrangement of the metal wires ML may be different from the arrangements as shown in FIGS. 1B-2, depending on the design needs.

Referring to FIGS. 1B and 2, the display panel 100 may further include a light shielding layer 293. In the embodiment, the light shielding layer 293 is such as a black matrix (BM), which is disposed on the second substrate 120. In the embodiment, a driver on panel 299 may be further disposed in the non-display region B, and the driver on panel 299 may be a gate on panel (GOP) or a data driver circuit. The GOP or the data driver circuit may be disposed simultaneously or separately on the panel. In the drawing, only one set of GOP is shown. However, more than one GOP or date driver may be disposed as well, depending on the design needs.

Figure 3:
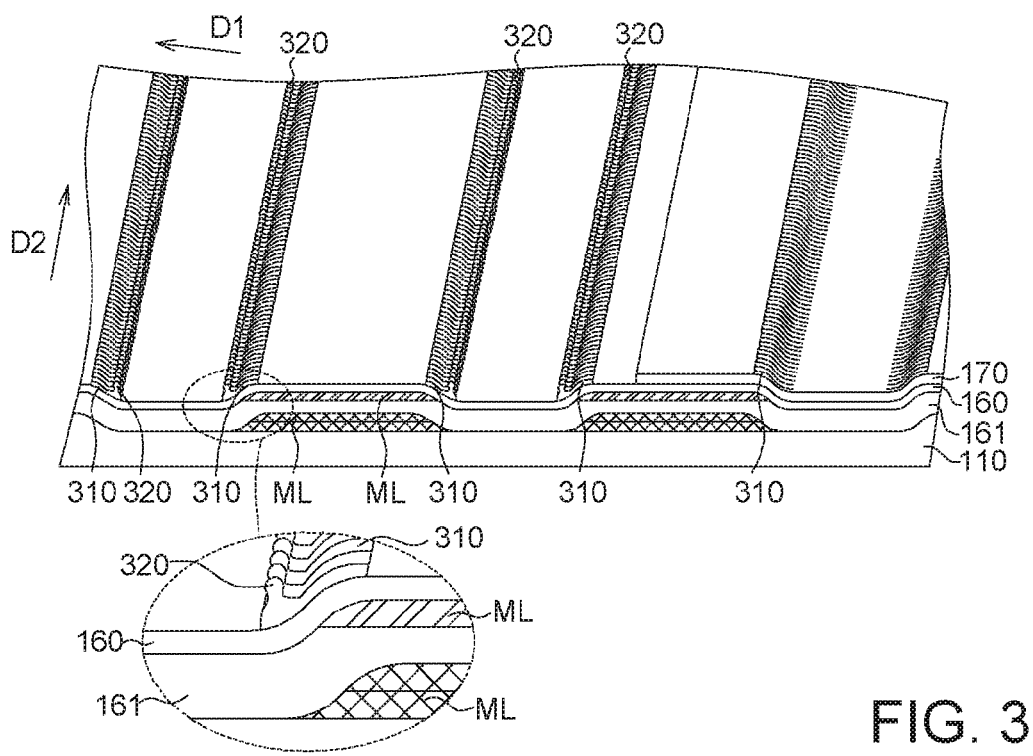
FIG. 3 shows a partial stereoscopic diagram of metal wires located in the non-display region as shown in FIG. 2.

FIG. 3 shows a partial stereoscopic diagram of metal wires ML located in the non-display region B as shown in FIG. 2.

In an embodiment, as shown in FIG. 3, the display panel 100 may further have a plurality of nanogrooves 310. The nanogrooves 310 are disposed on a side of at least one of the metal wires ML in the non-display region B. As shown in FIG. 3, the nanogrooves 310 are disposed on at least an inclined surface of the metal wires ML. In the embodiment, the nanogrooves 310 may also be formed on the inclined surfaces of two sides of one metal wire ML in the non-display region B. In the embodiment, the nanogrooves 310 may be further formed in the region with an alignment layer and the region without an alignment layer in the non-display region B. In the embodiment, as shown in FIG. 3, the extending direction D1 of the nanogrooves 310 intersects with the extending direction D2 of the metal wires ML, forming an angle. In an embodiment, the angle is, for example, about 90°.

In general, the metal wires ML in the non-display region B may easily reflect lights. According to the embodiments of the present disclosure, the nanogrooves 310 located on a side of the metal wires ML, particularly on an inclined surface of the metal wires ML, can reduce the reflection of lights by the metal wires ML, and the brightness of the region can be further reduced, forming an excellent dark region (disclination region). Moreover, the reduction of light leakage can be improved. In other embodiments, the metal wires ML may be provided with different types of arrangements and are not limited to the metal wires with line shapes. The nanogrooves 310 may be formed along with the formation of the first protection layer 160 on the metal wires ML by using a gray tone mask, or the nanogrooves 310 may be formed by adding a patterned insulation layer by applying different manufacturing processes or masks on the metal wires ML.

In an embodiment, as shown in FIG. 3, the display panel 100 may further include a plurality of submicron protrusions 320. The submicron protrusions 320 are disposed in the non-display region B. The submicron protrusions 320 are arranged along the extending direction D2 of at least one of the metal wires ML. In other words, the submicron protrusions 320 grow along the extending direction D2 of the metal wires ML. In an embodiment, the submicron protrusions 320 may be arranged parallel to the edge of the metal wires ML. In another embodiment, the submicron protrusions 320 may be formed on an inclined surface of the metal wires ML as well. The submicron protrusions 320 have a size of about less than 1 µm. In the embodiment, the submicron protrusions 320 are located in the area without an alignment layer in the non-display region B, and the submicron protrusions 320 may be located in an exposed area on the first surface 160s of the first protection layer 160. The submicron protrusions 320 may be formed along with the formation of the first protection layer 160 on the metal wires ML by using a gray tone mask, or the submicron protrusions 320 may be formed by adding a patterned insulation layer by applying different manufacturing processes or masks on the metal wires ML.

In the non-display region B, especially in the area without any alignment layer, the submicron protrusions 320 are arranged along the extending direction D2 of the metal wires ML, such that the edge of the metal wires ML is less smooth and straight, which lowers the reflection of lights by the metal wires ML. Accordingly, the brightness of the region can be reduced, forming an excellent dark region (disclination region), and the reduction of light leakage can be improved.

FIG. 4-1 shows a cross-sectional view of a display panel along the cross-sectional line 4-4' of FIG. 1A according to another embodiment of the present disclosure. In an embodiment, as shown in FIG. 4-1, the light shielding layer 293 is disposed on the second substrate 120, and at least a portion of the light shielding layer 293 is corresponding to the non-display region B. The light shielding layer 293 has a light transmitting portion 293a and a light shielding portion 293b, and particles are formed where corresponding to the light transmitting portion 293a and where corresponding to the light shielding portion 293b. The light transmitting portion 293a of the light shielding layer 293 is used for making the UV irradiation solidification reaction of the particles 180 more complete. In the embodiment, the particles are formed above the first substrate 110, and the particles may be further formed above the second substrate 120; accordingly, the surface roughness on the first substrate 110 and the surface roughness on the second substrate 120 are generated from the particles. The morphologies corresponding to different roughnesses have different influences on the tilt of liquid crystals, and the morphology with a larger roughness has a greater influence on the liquid crystals. As to in which way the roughness influences the tilt of liquid crystals and how it works, it depends on the different characteristics of particles in different regions as well as the range of the regions influenced by the operating voltage. The roughness being high or low may be controlled by a gray tone mask or by adjusting the irradiation level and time duration of the display region A and the non-display region B, respectively, with a mask.

As shown in FIG. 4-1, in the embodiment, a first surface roughness is generated from the particles 180a corresponding to the light transmitting portion 293a, and a second surface roughness is generated from the particles 180c corresponding to the light shielding portion 293b. The first surface roughness is greater than the second surface roughness. In an embodiment, the first surface roughness and the second surface roughness may represent a surface roughness on the first substrate 110 and a surface roughness on the second substrate 120.

As shown in FIG. 4-1, a third surface roughness is generated from the particles 180b corresponding to the display region A. In the embodiment, the first surface roughness is greater than the third surface roughness, and the third surface toughness is greater than the second surface roughness. In an embodiment, the first surface roughness, the second surface roughness, and the third surface roughness may represent a surface roughness on the second substrate 120.

As shown in FIG. 4-1, a fourth surface roughness is generated from the particles 180d correspondingly adjacent to the seal 295. The fourth surface roughness is greater than the third surface roughness. In an embodiment, the third surface roughness and the fourth surface roughness may represent a surface roughness on the first substrate 110.

FIG. 4-2 shows a cross-sectional view of a display panel according to another embodiment of the present disclosure. The elements in the present embodiment sharing the same or similar labels with those in the previous embodiments are the same or similar elements, and the description of which is omitted.

In the present embodiment, the display panel as shown in FIG. 4-2 may further include a planarization layer PLN covering the color filter layer 297. The electrode layer 190 may be patterned and formed on the planarization layer PLN. The electrode layer 190 is such as a pixel electrode. In the present embodiment, the light shielding layer 293 may be formed on the first substrate 110. As shown in FIG. 4-2, a portion of the light shielding layer 293 above the thin film transistor 140 is protruded and can be used as a photo spacer, and the photo spacer may touch the second substrate 120 (the two alignment layers on the two substrates touch each other), or the photo spacer may be separated from the second substrate 120 by a distance (the two alignment layers on the two substrates do not touch each other).

In the above-mentioned embodiments, the first surface roughness, the second surface roughness, the third surface roughness, and the fourth surface roughness may be at least one of rough-mean-square roughness, average roughness, or maximum roughness. In an embodiment, the first surface roughness, the second surface roughness, the third surface roughness, and the fourth surface roughness may be represented as average roughness.

Further illustration is provided with the following embodiments. Below are the results of roughness measured from several different regions of the display panel 100 for illustrating the properties of the display panel 100 according to the embodiments of the present disclosure. However, the following embodiments are for the purpose of elaboration only, not for limiting the scope of protection of the disclosure. The measured results of roughness of the regions are shown in Table 1, wherein the measured roughnesses include root-mean-square roughness (Rq), average roughness (Ra), and maximum roughness (Rmax). The values as shown in Table 1 are measured by AFM (VEECO Dimension-icon) within a selected area of 5*5 square microns ($\mu m^2$) of each of the samples.

than the average roughness (Ra=14.1 nm) generated from the particles corresponding to the light shielding portion 293b. In other words, the average roughness (the first average roughness) of the light transmitting portion 293a is the highest, followed by the average roughness the third average roughness) of the display region A, and the average roughness (the second average roughness) of the light shielding portion 293b is lower than that of the above-mentioned two regions. In an embodiment, as shown in Table 1, the first surface roughness is greater than a third surface roughness generated from the particles 180 on the light transmitting portion 293a corresponding to the display region A with the alignment layer, e.g. a pixel area, of the first substrate 110.

Referring to the FIG. 1B and Table 1, the average roughness (Ra=20.7 nm) generated from the particles corresponding to the light transmitting portion 293a of the non-display region B with the alignment layer is greater than the average roughness (Ra=12.2 nm) generated from the particles corresponding to the light shielding portion 293b of the first surface 160s of the first protection layer 160. Moreover, the average roughness (Ra=15.8 nm) generated from the particles corresponding to the display region A with alignment layer is greater than the average roughness (Ra=12.2 nm) generated from the particles corresponding to the light shielding portion 293b of the first surface 160s of the first protection layer 160. In other words, the average roughness (the first average roughness) of the light transmitting portion 293a of the non-display region B with alignment layer is the highest, and the average roughness (Ra=12.2 nm) generated from the particles corresponding to the light shielding portion 293b of the first surface 160s of the first protection layer 160 is the lowest. Likewise, the root-mean-square roughness (Rq=27.3 nm) of the light transmitting portion 293a of the non-display region B with alignment layer is the highest, and

TABLE 1

|  | Light transmitting portion 293a corresponding to the non-display region B with alignment layer (the first surface roughness) | Light shielding portion 293b corresponding to the non-display region B with alignment layer (the second surface roughness) | Light transmitting portion 293a corresponding to Display region A with alignment layer (the third surface roughness) | Light shielding portion 293b corresponding to the first surface 160s of the first protection layer 160 (without the alignment layer) | Light transmitting portion 293a corresponding to the first surface 160s of the first protection (without the alignment layer) |
|---|---|---|---|---|---|
| Root-mean-square roughness Rq (nm) | 27.3 | 18.7 | 20.6 | 16.4 | 22.4 |
| Average roughness Ra (nm) | 20.7 | 14.1 | 15.8 | 12.2 | 17.3 |
| Maximum roughness Rmax (nm) | 270 | 168 | 172 | 200 | 218 |

As shown in Table 1, the average roughness (Ra=20.7 nm) generated from the particles corresponding to the light transmitting portion 293a corresponding to the non-display region B with the alignment layer is greater than the average roughness (Ra=14.1 nm) generated from the particles corresponding to the light shielding portion 293b corresponding to the non-display region B with the alignment layer. Moreover, the average roughness (Ra=15.8 nm) generated from the particles corresponding to the display region A is greater the root-mean-square roughness (Rq=16.4 nm) generated from the particles corresponding to the light shielding portion 293b of the first surface 160s of the first protection layer 160 is the lowest. Likewise, the maximum roughness (Rmax=270 nm) of the light transmitting portion 293a of the non-display region B with alignment layer is greater than the maximum roughness (Rmax=200 nm) generated from the particles corresponding to the light shielding portion 293b of the first surface 160s of the first protection layer 160.

In addition, the root-mean-square roughness (Rq=27.3 nm) and the maximum roughness (Rmax=270 nm) generated from the particles corresponding to the light transmitting portion 293a of the non-display region B are greater than the root-mean-square roughness (Rq=18.7 nm) and the maximum roughness (Rmax=168 nm) generated from the particles corresponding to the light shielding portion 293b of the non-display region B, respectively. Moreover, the root-mean-square roughness (Rq=20.6 nm) and the maximum roughness (Rmax=172 nm) generated from the particles corresponding to the display region A are greater than the root-mean-square roughness (Rq=18.7 nm) and the maximum roughness (Rmax=168 nm) generated from the particles corresponding to the light shielding portion 293b, respectively. Therefore, different from the display region A which is applied by a pixel operation voltage, in the non-display region B, the roughness of the morphology formed from the particles of the light transmitting portion 293a can increase the influence on liquid crystals, such that the particles 180 located in the non-display region B provide a better vertical alignment function for the liquid crystal molecules in the liquid crystal layer 130, thereby recovery is faster when the liquid crystal molecules are under external force operations, the light leakage of the display panel 100 is reduced, and hence the qualities of the display images are improved. On the other hand, since lights are shielded in the light shielding portion 293b, the roughness of the morphology formed from the particles of the light shielding portion 293b is lower than that of the light transmitting portion 293a. In addition, since the pixel operation voltage is applied to the display region A in a display mode, the roughness of the display region A is lower than that of the light transmitting portion 293a of the non-display region B. Accordingly, the roughness (the first root-mean-square roughness, the first maximum roughness) is the highest, the roughness of the display region A (the third root-mean-square roughness, the third maximum roughness) is the second highest, and the roughness of the light shielding portion 293b is lower than those of the above-mentioned two regions. Regarding the fourth surface roughness adjacent to the seal 295, since the angle of light irradiation when the seal 295 is solidified can be adjusted, the surface referring to the fourth surface roughness can be influenced by more light irradiation, and the time duration of the light irradiation of the surface referring to the fourth surface roughness is longer than that of other regions; as a result, the fourth surface roughness is greater than that of other surfaces.

Figure 5:
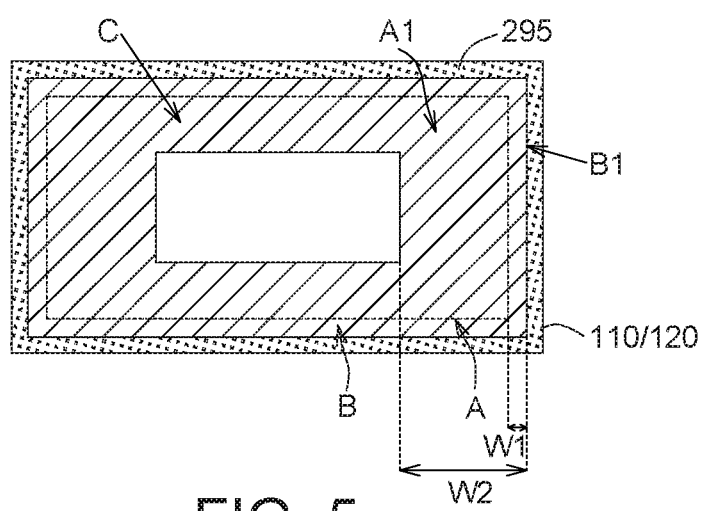
FIG. 5 shows a top view of a display panel according to another embodiment of the present disclosure.

FIG. 5 shows a top view of a display panel 200 according to another embodiment of the present disclosure. As shown in FIG. 5, the display panel 200 includes the first substrate 110, the second substrate 120, the liquid crystal layer (not shown), a shielding pattern C, and at least a reactive monomer. The reactive monomer refers to a material added into the liquid crystal layer, having specific functional group(s), i.e. acrylate group, and undergoing a polymerization reaction under irradiation with a light of specific wavelength ranges for forming a polymer structure. The first substrate 110 has at least one display region A and one non-display region B located outside the display region A. The second substrate 120 is disposed opposite to the first substrate 110. The liquid crystal layer is disposed between the first substrate 110 and the second substrate 120, and the reactive monomer is mixed in at least the liquid crystal layer. The shielding pattern C may be disposed on the first substrate 110 or the second substrate 120 and corresponding to the non-display region B and a margin portion A1 of the display region A adjacent to the non-display region B. That is, the shielding pattern C is located at the non-display region B and the display region A and extends from the inner edge of the seal 295 to the non-display region B and the display region A, while a shielding pattern located on or overlap the seal 295 or located outside the outer edge of the seal 295 (not shown) is not regarded as the shielding pattern C described in the present disclosure. Within a first region corresponding to the shielding pattern C, an aperture ratio of the first region is X, the reactive monomer has a concentration of Y ppm, and X and Y satisfy the following formula: $2847.7e^{-3.6375X} > Y > 1774.1e^{-8.9014X}$. In an embodiment, a first region is covered by the shielding pattern C. In an embodiment, an aperture ratio of the first region is X, which is 0-1, the reactive monomer corresponding to the first region has a concentration of Y ppm, and X and Y satisfy the following formula: $2847.7e^{-3.6375X} > Y > 1774.1e^{-8.9014X}$. The aperture ratio refers to the ratio of the area of the effective region where a light can pass through to the area of the total region.

Figure 6:
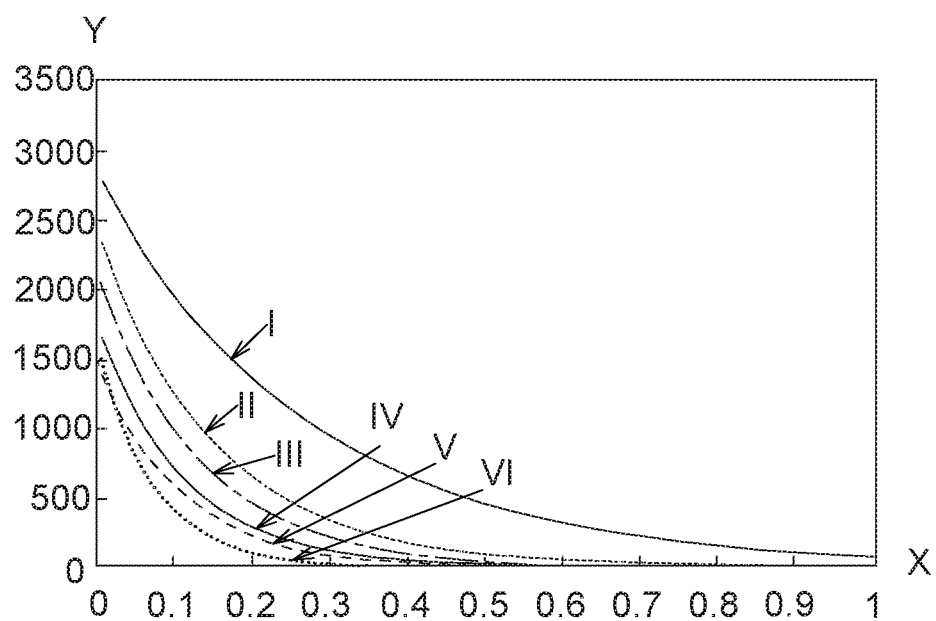
FIG. 6 shows relationships between aperture ratios of shielding patterns vs. concentrations of reactive monomers according to the embodiments of the present disclosure.

FIG. 6 shows relationships between aperture ratios (X) of shielding patterns vs. concentrations (Y) of reactive monomers corresponding to the shielding pattern C according to the embodiments of the present disclosure. In the embodiments, the concentrations of the reactive monomers refer to the amounts of residual reactive monomers, and the aperture ratios represent the light transmission. In FIG. 6, curves I, II, III, IV, V, and VI represent the relationships between aperture ratios (X) of shielding patterns and concentrations (Y) of reactive monomers with irradiation time durations of 30 minutes, 60 minutes, 90 minutes, 120 minutes, 150 minutes, and 180 minutes, respectively. As shown in FIG. 6, different aperture ratios may cause different amounts of residual reactive monomers. The longer the reaction time is, the less the amount of residual reactive monomers is. While the amount of residual reactive monomers is high, the image sticking phenomenon of display panels would be serious, and the qualities of the display images would be terrible.

Figure 7:
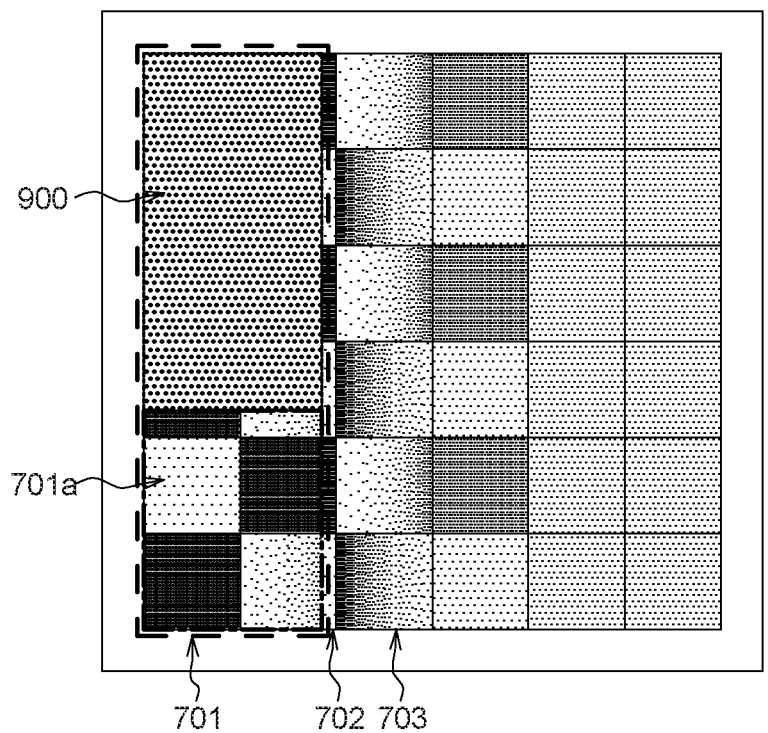
FIG. 7 shows a schematic diagram of aperture ratios of shielding patterns vs. image sticking phenomenon.

FIG. 7 shows a schematic diagram of aperture ratios of shielding patterns vs. image sticking phenomenon of a display panel. In FIG. 7, check patterns are used as the test image, wherein the check patterns are continuously shown for a period of time, the images of the checks are then set at the same gray level for comparing the image sticking phenomenon thereof. First, regions 701 of FIG. 7 are adhered with shielding films 900, and check patterns are displayed, wherein the shielding films 900 can be used to shield the irradiation by a light with a wavelength range (200-400 nm) for polymerization of reactive monomers. After a period of testing time, the images are set at the same gray level, and the shielding films 900 are removed from some of the regions, resulting in the pattern as shown by regions 701a. Since the aperture ratio of the region 701 is 0, the reactive monomers in the region 701 cannot absorb any light with a wavelength range capable of reacting the monomers for forming a polymer structure, such that a large amount of residual reactive monomers could cause very serious image sticking phenomenon in that region. While the aperture ratio of the region 701 is 0, and the aperture ratio of the region 703 is greater than that of the region 701, the region 702 located at the boundary between the regions 701 and 703 has an aperture ratio equal to that of the region 703. As shown in FIG. 7, it is apparent that the image sticking of the region 701 with an aperture ratio of 0 is very serious, in contrast, the image sticking of the region 703 having a higher aperture ratio is less serious. In addition, despite that the region 702 has an aperture ratio equal to that of the region 703, the image sticking of the region 702 is more serious than that of the region 703 due to the un-reacted reactive monomers diffusing from the region 701 to the region 702.

In an embodiment, while the un-reacted reactive monomers have a concentration of less than 400 ppm and larger than 0 ppm (0<Y<400), and the aperture ratio of the shielding pattern is larger than 10% and smaller than 100% (0.1≤X<1), the display panel 200 is provided with less image sticking, and hence has better qualities of display images.

In an embodiment, while the display panel 200 is a large-sized display panel, as shown in FIG. 5, the region covered by the shielding pattern C extends from a margin portion B1 of the non-display region B to at least part of the display region A. The margin portion B1 is adjacent to the seal 295. The shielding pattern C extends by a distance W2 of 10-15 time of a width W1 of the non-display region B.

In an embodiment, while the display panel 200 is a small-sized display panel, the region covered by the shielding pattern C extends from the margin portion B1 (that is, from the inner edge of the seal 295) of the non-display region B to at least part of the display region A, and the shielding pattern C extends by the distance W2 of about 3 cm. Alternatively, the region covered by the shielding pattern C extends from the two peripheries B1 of two opposites sides of the non-display region B to the display region A, and the shielding pattern C extends by a total distance of about 6 cm which is the sum of the two distances W2. In the embodiment, while the display panel 200 is a small-sized display panel, such as a cell phone display panel, the shielding pattern C may fully cover the non-display region B and the display region A.

Figure 8A:
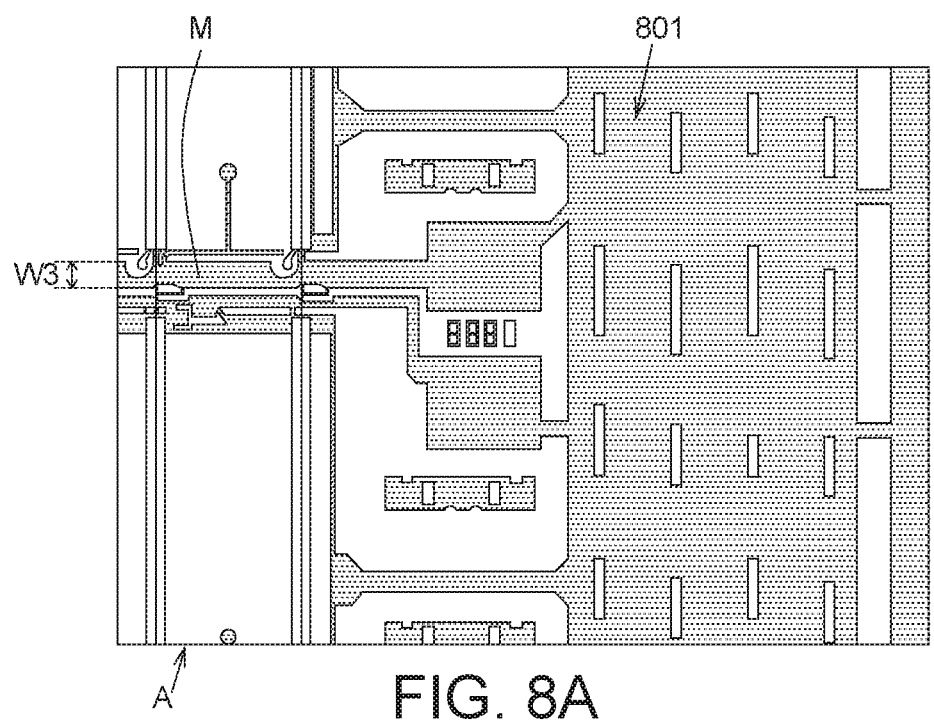
FIG. 8A shows a schematic diagram of a shielding pattern according to an embodiment of the present disclosure.
Figure 8B:
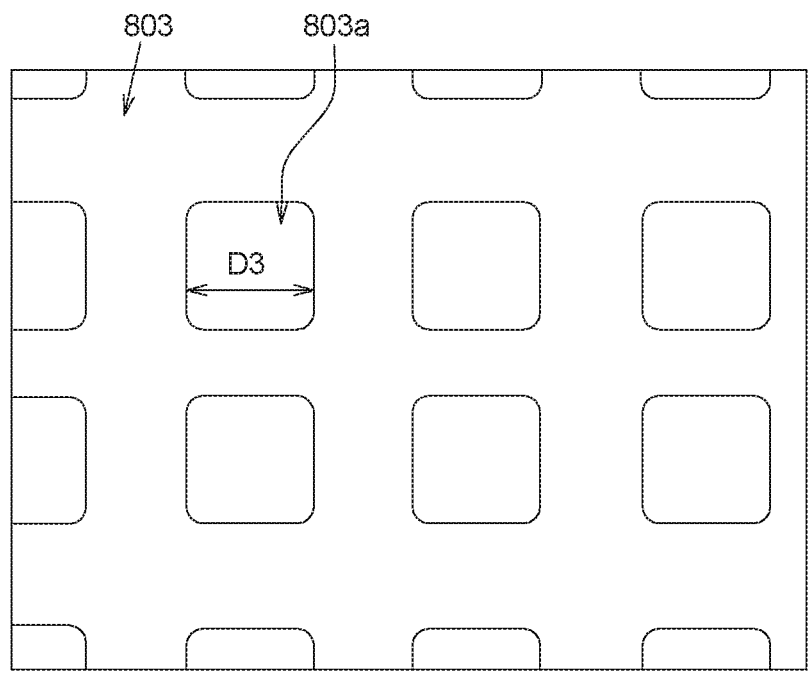
FIG. 8B shows a schematic diagram of a shielding pattern according to another embodiment of the present disclosure.

FIG. 8A shows a schematic diagram of a shielding pattern 801 according to an embodiment of the present disclosure, and FIG. 8B shows a schematic diagram of a shielding pattern 803 according to another embodiment of the present disclosure. In the embodiment, the shielding pattern may include a plurality of metal wires, a light shielding layer, of the combination thereof. As shown in FIG. 8A, the shielding pattern 801 includes such as a plurality of metal wires, and as shown in FIG. 8B, the shielding pattern 803 includes such as a shielding layer.

As shown in FIG. 8A, the metal wires M of the shielding pattern 801 located in a margin portion of the display region A have a line width W3 of such as smaller than 50 μm. The margin portion of the display region A is adjacent to the non-display region B.

As shown in FIG. 8B, the shielding pattern 803 is such as a shielding layer having a plurality of openings 803a of a size D3 of such as about 100 μm.

Figure 9A:
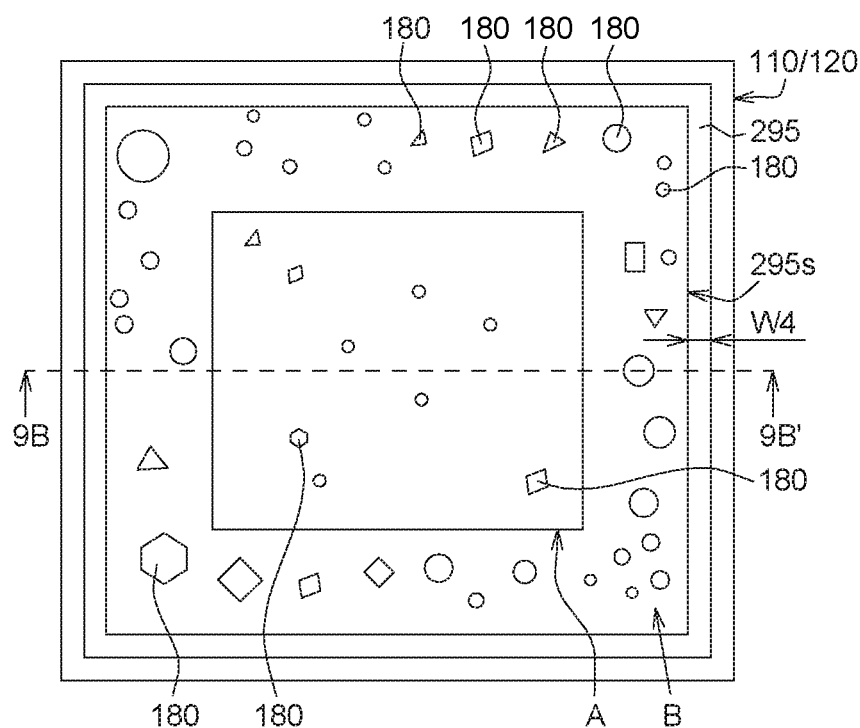
FIG. 9A shows a top view of a display panel according to an additional embodiment of the present disclosure.
Figure 9B:
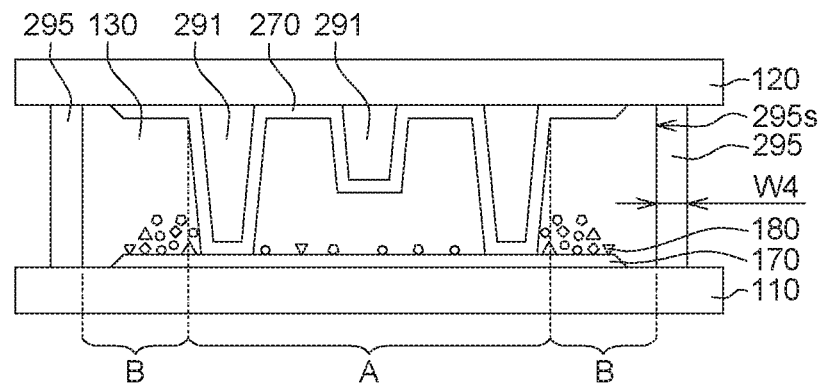
FIG. 9B shows a cross-sectional view along the cross-sectional line 9B-9B' of FIG. 9A.

FIG. 9A shows a top view of a display panel 1100 according to an embodiment of the present disclosure, and FIG. 9B shows a cross-sectional view along the cross-sectional line 9B-9B' of FIG. 9A. Referring to FIGS. 9A-9B, the display panel 1100 includes a first substrate 110 and a plurality of particles 180. In the embodiments, the particles 180 may be agglomerate polymer particles. The first substrate 110 has a display region A and a non-display region B adjacent to the display region A. The display region A represents the region of the display panel 1100 for displaying images, and the non-display region B represents the region not for displaying images. The particles 180 are disposed on the first substrate 110. In an embodiment, as shown in FIG. 9A, the non-display region B surrounds the display region A.

In the embodiment, the distribution density of the particles 180 located in at least a portion of the non-display region B is different from the distribution density of the particles 180 located in the display region A. In other words, the particles 180 located in different portions of the non-display region B may have different distribution densities; that is, the particles 180 located in at least some portions of the non-display region B have distribution densities different from the distribution density of the particles 180 located in the display region A. Moreover, the particles 180 have irregular shapes and sizes. In the embodiment, the display region A includes at least one pixel area, and is used for displaying images, and the non-display region B is such as a fan-out area or a wiring area. However, the non-display region B may include any area which is not for displaying images and is not limited to the above-mentioned example.

In an embodiment, the distribution density of the particles 180 located in the non-display region B having a size of 10-50 nm is different from the distribution density of the particles 180 located in the non-display region B having a size of 50-100 nm. Moreover, among the particles 180 located in the non-display region B, those with a size of 10-50 nm have a higher distribution density than those with a size of 50-100 nm. The distribution density is calculated within a unit area of 5 μm*5 μm. The distribution densities of the particles 180 in different regions may be compared by calculating the average values of the numbers of the particles 180 in a selected unit area of 5 μm*5 μm in each of the regions for comparison, and the selected unit area may be different from 5 μm*5 μm, as long as the selected unit areas in each of the regions are the same.

In another embodiment, among the particles 180 having a size of 50-100 nm, those located in at least a portion (e.g. some local regions) of the non-display region B have a different distance between the particles 180 from the distance between those located in the display region A. For example, among the particles 180 having a size of 50-100 nm, the distance between any two of the adjacent particles 180 located in the non-display region B is different from the distance between any two of the adjacent particles 180 located in the display region A. In an embodiment, among the particles 180 having a size of 50-100 nm, the distance between any two of the adjacent particles 180 located in the non-display region B is smaller than the distance between any two of the adjacent particles 180 located in the display region A. It is to be noted that the distance described herein indicates at least one of a minimum distance or an average distance.

In the embodiment, the particles 180 located in the non-display region B do not have any particular arrangement(s) and orientation(s). In other words, the particles 180 are arranged irregularly on the first substrate 110. The particles 180 located in the display region A have particular arrangement(s) for aligning the liquid crystals to tilt toward particular direction(s). The particles 180 located in different region may be provided with different functions according to the irradiation curing process applied thereon and whether an electric field is applied thereon, or the irradiation amount adjusted by using a gray tone mask. The distribution density of the particles 180 located in at least a portion of the non-display region B is greater than the distribution density of the irregularly arranged particles 180 located in the display region A. Since the particles 180 located in the non-display region B do not have any particular orientation(s), the liquid crystals in the region do not tilt toward particular direction(s), thereby the region turns into a dark region, which lowers the light transmittance, and hence the light leakage issue of the display panel 1100 can be improved.

As shown in FIGS. 9A-9B, the display panel 1100 may further include a second substrate 120, a seal 295, a liquid crystal layer 130, and a plurality of spacers 291. The second substrate 120 and the first substrate 110 are disposed opposite to each other. The liquid crystal layer 130 and the seal 295 are disposed between the first substrate 110 and the second substrate 120. The seal 295 is located outside the non-display region B. The spacers 291 are disposed between the first substrate 110 and the second substrate 120 for providing a gap for disposing the liquid crystal layer 130. The spacers 291 may have different heights for proving buffering when the panel is pressed. In another embodiment, the spacers 291 may be disposed on the first substrate 110. The particles 180 are in direct contact with the liquid crystal molecules in the liquid crystal layer 130. It is also important to point out that the particles 180 are not necessarily drawn to scale according to the actual products, and the drawings are for illustrating the embodiments only and not for limiting the scope of protection of the disclosure.

In the embodiment, since the particles 180 located in the non-display region B are not provided with any unifying alignment functions for guiding particular directions, and accordingly are not provided with any unifying alignment functions for the liquid crystal molecules. Therefore, in the non-display region B, the liquid crystal molecules in the liquid crystal layer 130 may tilt toward any possible directions, thereby the liquid crystal molecules may tilt isotropically and form a relative dark area compared to the region where the liquid crystal molecules tilt to a predetermined direction regularly, the light transmittance of the non-display region is lowered, and the light leakage issue of the display panel 1100 is improved, which further increases the contrast and quality of the images displayed in the display region.

According to the embodiments of the present disclosure, the particles 180 are not limited to have particular sizes or shapes, and the sizes can be adjusted according to application needs. In an embodiment, the distribution density of the particles 180 having a size of 10-100 nm located in the non-display region B is greater than the distribution density of the particles 180 having a size of 10-100 nm located in the display region A. In another embodiment, in the non-display region B, the distribution density of the particles 180 having a size of 10-50 nm is greater than the distribution density of the particles 180 having a size of 50-100 nm. In a further embodiment, in the non-display region B, the distribution density of the particles 180 having a size of 50-100 nm located on the first substrate 110 is lower than the distribution density of those located on the second substrate 120. It is important to point out that since the particles 180 do not have particular shapes, the term of "size" refers to the dimension(s) of the particles 180, which may be diameter, height, width, or any expression suitable for representing the size of one particle 180.

In the embodiment, the display panel 1100 may further include a thin film transistor array and a color filter layer on the first substrate 110. In an alternative embodiment, the color filter layer may be disposed on the second substrate 120.

In the embodiment, the display panel 1100 may further include a first alignment layer 170 disposed between the first substrate 110 and the second substrate 120. For example, the first alignment layer 170 is disposed on the first substrate 110 or on the second substrate 120, and the particles 180 are formed on the first alignment layer 170. In an embodiment, as shown in FIGS. 9A-9B, the display panel 1100 may include two alignment layers 170 and 270 formed on the first substrate 110 and the second substrate 120, respectively, and the particles 180 are formed on the first alignment layer 170 located close to the first substrate 110. In the embodiment, the first alignment layer 170 may be a polyimide (PI) film.

In the embodiment, the particles 180 may be formed by a variety of processes. In an embodiment, UV curable monomers are added while forming the liquid crystal layer 130, or the first alignment layer 170, and then a UV irradiation process is performed from the first substrate 110 side or the second substrate 120 side for forming the particles 180 on the first substrate 110 or on the first alignment layer 170. The material of the particles 180 formed by irradiating UV curable monomers is polymer. Polymerization degrees of the polymer in different regions are different from one another; thereby the distribution densities of the particles 180 in different regions are different.

In an embodiment, the display panel 1100 is such as a nano-protrusion vertical aligned liquid crystal display panel, and the particles 180 and the nano-protrusion alignment structure on the surface of the first alignment layer 170 can be formed from the same monomers. For example, the nano-protrusion alignment structure can be formed in the display region A by polymerizing the monomers in the display region A while an external electric field is continuously applied thereon, and the particles 180 can be formed by polymerizing the monomers in the non-display region B without applying any external electric field, the particles 180 being irregularly arranged and lacking particular alignment directions. As such, the nano-protrusion alignment structure located in the display region A can help the liquid crystal molecules to align with predetermined direction(s), and the particles 180, lacking particular alignment directions, located in the non-display region B can cause the liquid crystal molecules in the non-display region B to tilt toward various directions for forming an excellent dark area. As such, the possibility of the light leakage of the display panel 1100 is decreased, and the contrast and the displaying quality of the display panel 1100 are improved.

The aforementioned nano-protrusion alignment structure and the particles 180 located in different designated region may be manufactured by various processes. For example, via the design of a patterned electrode, wherein the patterned electrode is not formed on the region of the substrate corresponding to the non-display region B, the monomers located corresponding to the non-display region B are therefore not influenced by the electric field while being cured by UV irradiation. Alternatively, a patterned mask is applied to shield the non-display region B while the monomers are irradiated with UV light and applied with a continuously electric field, such that the monomers in the non-display region B do not undergo polymerization reaction, and the monomers in the non-display region B undergo polymerization under UV irradiation after the electric field is removed.

Furthermore, the above-mentioned shielding design from the UV irradiation for the non-display region B can utilize additional patterned masks or structural arrangements of originally existing elements in the display panel. For example, a metal wiring or a black matrix located in the non-display region B can be used for shielding the non-display region B from UV irradiation. The black matrix can be designed as a patterned black matrix with through holes for UV light to pass through, such that the monomers in the non-display region B may undergo polymerization reaction to form the particles 180. In the embodiment, the UV irradiation is preferably performed from the substrate side without the color filter layer disposed thereon.

In other words, the formation of a number of the particles 180, which are irregularly arranged and lack unifying alignment functions, in the non-display region B can further consume the residual monomers in the liquid crystal layer 130. As such, the polar impurities absorbed by the unreacted monomers in the liquid crystal layer 130 or that the residual monomers polymerize and form protrusion structures with alignment functions in the non-display region B can be reduced. Accordingly, deterioration of materials is reduced, light leakage of the display panel is decreased, and the contrast and displaying quality of the display panel can be further improved.

Figure 10:
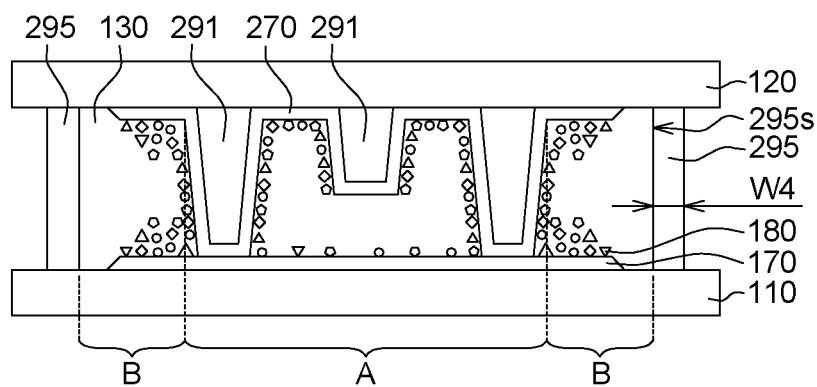
FIG. 10 shows a cross-sectional view of a display panel according to another additional embodiment of the present disclosure.

FIG. 10 shows a cross-sectional view of a display panel 1200 according to another additional embodiment of the present disclosure. As shown in FIG. 10, a plurality of the particles 180 may be further disposed on the second substrate 120. In the embodiment, in the non-display region B, the distribution density of the particles 180 located on the first substrate 110 is different from the distribution density of the particles 180 located on the second substrate 120. In an embodiment, UV curable monomers are added while forming the liquid crystal layer 130, the first alignment layer 170 or the second alignment layer 270, and then a UV irradiation process is performed from the first substrate 110 side or the second substrate 120 side for forming the particles 180 on the first substrate 110 the first alignment layer 170 or the second alignment layer 270. For example, while the particles 180 are formed by a UV curing process performed on UV curable monomers, the particles 180 formed on the UV irradiation side of the substrate, which side is closer to the UV light, have a relatively high distribution density and a relatively large size. Alternatively, the sizes and the locations of the particles 180 can be controlled by adjusting the focus or the wavelength range of the UV irradiation.

In an embodiment, in the non-display region B, the distribution density of the particles 180 having a size of 50-100 nm located on the first substrate 110 is lower than the distribution density of the particles 180 located on the second substrate 120. In the present embodiment, the particles 180 are formed by a UV irradiation process performed on UV curable monomers, and the UV irradiation process is performed from the second substrate 120 side.

Figure 11:
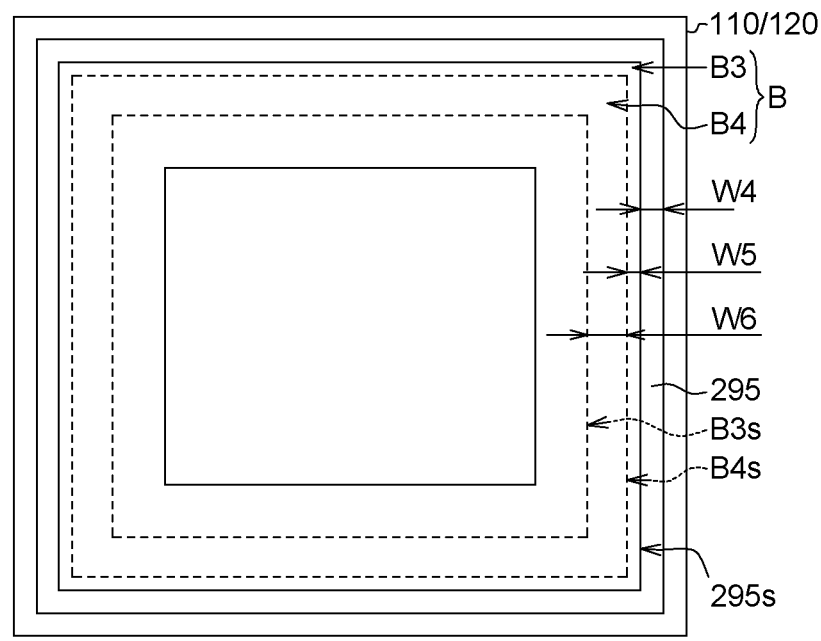
FIG. 11 shows a top view of a display panel according to a further embodiment of the present disclosure.

FIG. 11 shows a top view of a display panel 300 according to a further embodiment of the present disclosure. As shown in FIG. 11, the seal 295 has a first width W4 and a first sidewall 295s, and the first sidewall 295s is adjacent to the non-display region B. The non-display region B can be divided into two regions B3 and B4. The region B3 includes the range starting from the first sidewall 295s and extending a second width W5 away from the first sidewall 295s, the second width W5 is the distance between the first sidewall 295s and the second sidewall B3s, and the second width W5 is less than the first width W4. The region B4 includes a range starting from the second sidewall B3s and extending a third width W6 away from the second sidewall B3s, the third width W6 is the distance between the second sidewall B3s and the third sidewall B4s, and the third width W6 is larger than one time the first width W4 to less than two times the first width W4. In the embodiment, the distribution density of the particles 180 on the second substrate 120 and located in the region B3 is different from the distribution density of the particles 180 located in the region B4. The amount of the particles 180 having a size of 50-100 nm located in the region B3 is more than the amount of the particles 180 having a size of 50-100 nm located in the region B4. In the embodiment, by controlling the range the UV irradiation covers and the wavelength of the UV irradiation, the particles 180 can be formed together with the curing of the seal 295 by the UV irradiation process. Accordingly, the seal 295 and the particles 180 can be formed in single UV irradiation step. As such, the irradiation energy is reduced, the monomers neighboring the seal 295 can react together and form the particles 180 having relatively large sizes, and the light leakage of the display panel can be further reduced.

Figure 12:
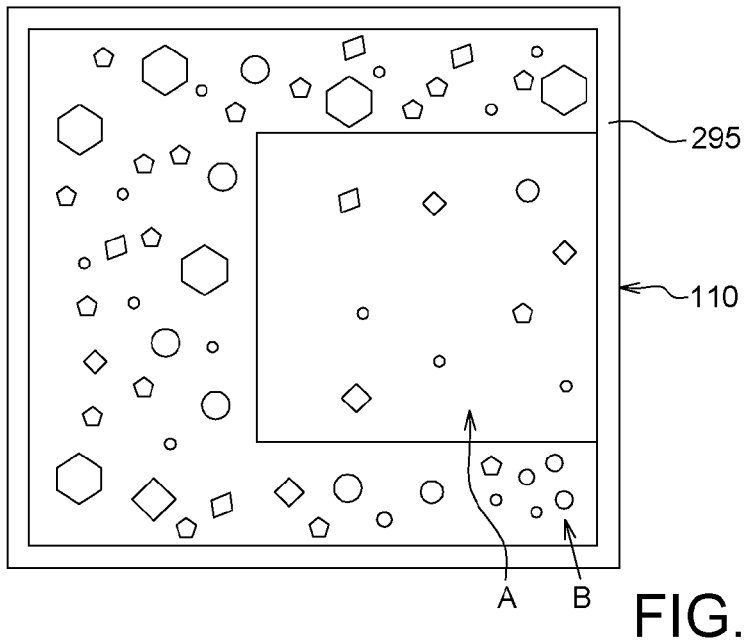
FIG. 12 shows a top view of a display panel according to a still further embodiment of the present disclosure.

FIG. 12 shows a top view of a display panel 400 according to a still further embodiment of the present disclosure. In the embodiment, as shown in FIG. 12, the non-display region B' is disposed adjacent to the display region A' but not surrounding the display region A. The distribution density of the particles 180 located in at least a portion of the non-display region B' is different from the distribution density of the particles 180 located in the display region A'. In an embodiment, the distribution density of the particles 180 having a size of 10-100 nm located in the non-display region B' is greater than the distribution density of the particles 180 having a size of 10-100 nm located in the display region A. In another embodiment, the distribution density of the particles 180 (with no size limitation) located in at least a portion of the non-display region B' is greater than the distribution density of the particles 180 (with no size limitation) located in the display region A'.

Figure 13:
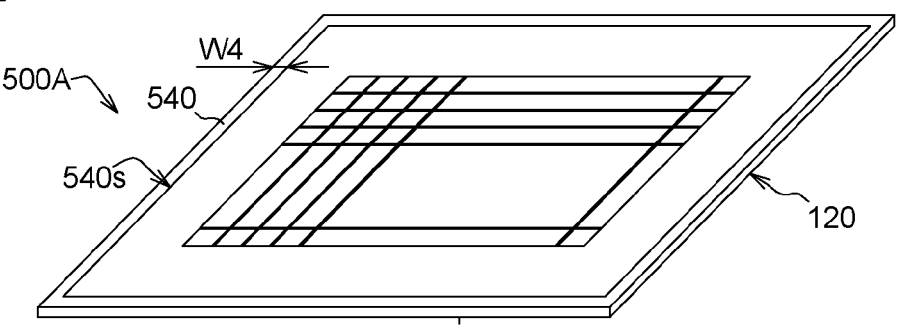
FIG. 13 shows a simplified explosion diagram of a display device according to an embodiment of the present disclosure.
Figure 13:
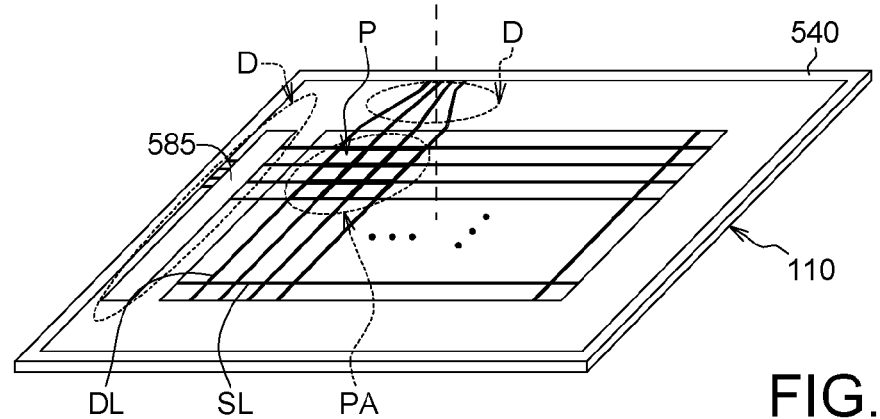
Figure 14:
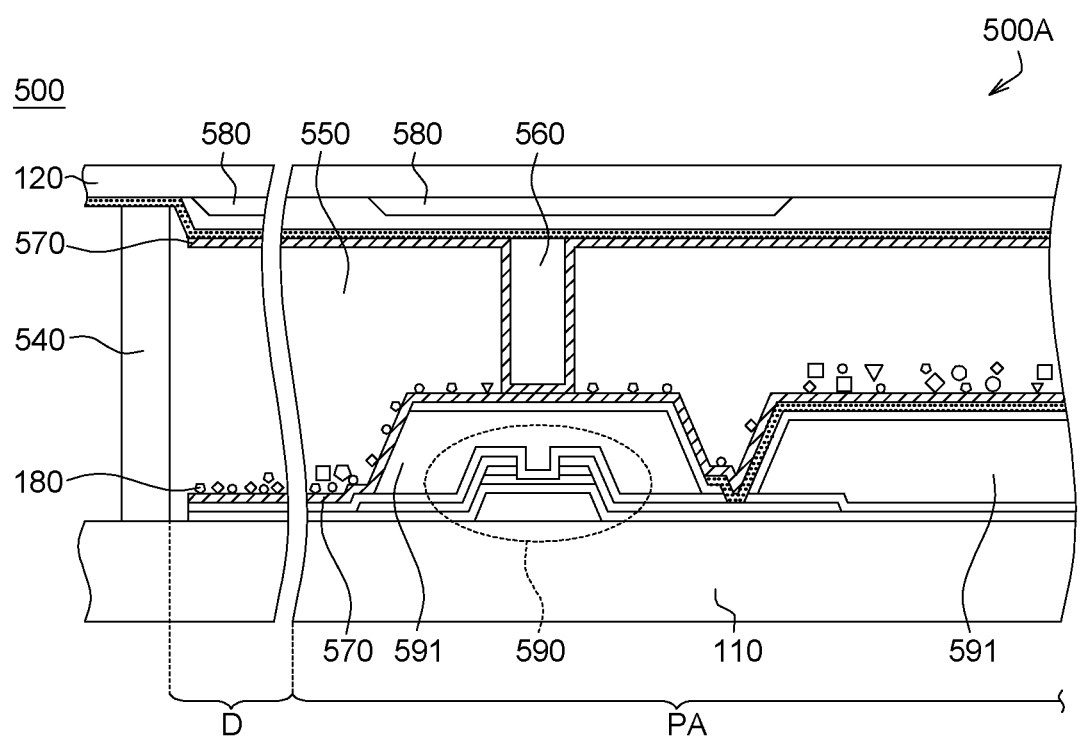
FIG. 14 shows a cross-sectional view of a display device according to a still another embodiment of the present disclosure.

FIG. 13 shows a simplified explosion diagram of a display device 500 according to an embodiment of the present disclosure, and FIG. 14 shows a cross-sectional view of a display device 600 according to a still another embodiment of the present disclosure. It is to be noted that some of the elements in FIGS. 13-14 are omitted or simplified for illustrating the embodiments. The details of the structures of the embodiments are not drawn to scale and for exemplification only, thus not for limiting the scope of protection of the disclosure. In the present embodiment, the seal 540 is adjacent to and aligned with the sidewalls of the substrates 110/120. In an alternative embodiment, the seal is not necessarily adjacent to the sidewalls of the substrate 110/120.

Referring to FIGS. 13-14, the display device 500 includes a display panel 500A. The display panel 500A includes the first substrate 110, the second substrate 120, at least a data line DL, at least a scan line SL, a wiring area D, the liquid crystal layer 550, the alignment layer 570, the spacers 560, the seal 540, and the particles 180. The first substrate 110 and the second substrate 120 are disposed opposite to each other. The first substrate 110 has at least a display region PA having at least a pixel P. The data line DL and the scan line SL are intersected for defining a plurality of pixels. The wiring area D is located in the non-display region outside the display region PA. The data line DL disposed in the display region PA, the scan line SL disposed in the display region PA, and the wiring line disposed in the wiring area D may be non-linear. The liquid crystal layer 550 and the alignment layer 570 are disposed between the first substrate 110 and the second substrate 120. The spacers 560 are disposed between the first substrate 110 and the second substrate 120 for providing a gap for disposing the liquid crystal layer 550. The seal 540 is disposed between the first substrate 110 and the second substrate 120 and located outside the wiring area D. The particles 180 are formed on the alignment layer 570. The distribution density of the particles 180 located corresponding to at least a portion of the wiring area D is greater than the distribution density of the particles 180 located corresponding to the display region PA.

In the embodiment, the display panel 500A includes, for example, two alignment layers 570 formed on the first substrate 110 and the second substrate 120, respectively. The particles 180 are formed on at least one of the alignment layers 570 on at least one of the first substrate 110 or the second substrate 120. The above-mentioned particles 180 located corresponding to the wiring area D or corresponding to the display region PA may be formed on both of the alignment layer 570 on the first substrate 110 and the second substrate 120. In fact, the above-mentioned particles 180 located corresponding to the wiring area D or corresponding to the display region PA simply refers to the range which the particles 180 are located corresponding to.

As shown in FIGS. 13-14, the display device 500 may further include a black matrix (BM) 580, a thin film transistor array 590, and a color filter layer 591. The thin film transistor array 590 and the color filter layer 591 are disposed on the first substrate 110, and the black matrix 580 is disposed on the second substrate 120. In the embodiment, the wiring area D may include one or more than one driver on panel 585, such as a gate driver on panel (GOP) or a data driver on panel or both of the above. One set of GOP is illustrated in FIG. 13; however, a plurality sets of the gate driver and/or the data driver on panel may be arranged as well depending on the design requirements.

In an embodiment, in the wiring area D, the distribution density of the particles 180 on the first substrate 110 is different from the distribution density of the particles 180 on the second substrate 120.

In an embodiment, in the wiring area D, the distribution density of the particles 180 having a size of 10-50 nm is greater than the distribution density of the particles 180 having a size of 50-100 nm. The distribution density is calculated within a unit area of 5 μm*5 μm. The distribution densities of the particles 180 in different regions may be compared by calculating the average values of the numbers of the particles 180 in a selected unit area of 5 μm*5 μm in each of the regions for comparison, and the selected unit area may be different from 5 μm*5 μm, as long as the selected unit areas in each of the regions are the same.

In an embodiment, referring to FIGS. 11 and 13-14, the seal 540 has the first width W4 and the first sidewall 540s adjacent to the wiring area D. The wiring area D can be divided into two regions. The first region includes the range starting from the first sidewall 540s and extending the second width W5 away from the first sidewall 540s, and the second width W5 is less than the first width W4. The second region includes a range starting from the first region and extending the third width W6 away from the sidewall adjacent to the first region, and the third width W6 is greater than one time the first width W4 to less than two times the first width W4. In the embodiment, the distribution density of the particles 180 on the second substrate 120 and located in the first region is different from the distribution density of the particles 180 located in the second region.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
   a first substrate and a second substrate disposed opposite to the first substrate, wherein the first substrate has a display region and a non-display region located outside the display region;
   at least a data line and at least a scan line disposed in the display region;
   a liquid crystal layer disposed between the first substrate and the second substrate;
   a plurality of spacers disposed on the first substrate or on the second substrate;
   a seal disposed between the first substrate and the second substrate;
   a light shielding layer disposed on the first substrate or on the second substrate, and comprising a light transmitting portion and a light shielding portion; and
   an alignment layer and a plurality of particles disposed on the light transmitting portion and the light shielding portion;
   wherein a first surface roughness corresponding to the light transmitting portion of the non-display region is greater than a second surface roughness corresponding to the light shielding portion of the non-display region.

2. The display panel according to claim 1, wherein the distribution density of the particles having a size of 10-100 nm located in the non-display region is greater than the distribution density of those located in the display region.

3. The display panel according to claim 1, wherein the distribution density of the particles located in the non-display region having a size of 10-50 nm is greater than the distribution density of those having a size of 50-100 nm.

4. The display panel according to claim 1, wherein the seal has a first width and a first sidewall, the first sidewall is adjacent to the non-display region, and the distribution density of the particles located on the second substrate within a range starting from the first sidewall to less than one time the first width away from the first sidewall is different from the distribution density of those within a range starting from greater than one time the first width to less than three times the first width away from the first sidewall.

5. The display panel according to claim 1, wherein the first surface roughness is greater than a third surface roughness generated from the particles on the light transmitting portion of the display region of the first substrate.

6. The display panel according to claim 1, wherein the distribution density of the particles having a size of 50-100 nm located in the non-display region on the first substrate is lower than the distribution density of those on the second substrate.

7. The display panel according to claim 1, further comprising:
   a plurality of thin film transistors disposed on the first substrate;
   a plurality of metal wires disposed on the first substrate; and
   a protection layer overlaying at least a portion of the metal wires,
   wherein the alignment layer is disposed on the protection layer for exposing a first surface of the protection layer; and the particles are disposed on at least a portion of the first surface.

8. The display panel according to claim 7, wherein the protection layer is in direct contact with at least one of the thin film transistors or the metal wires.

9. The display panel according to claim 7, wherein the protection layer comprises an inorganic dielectric material.

10. The display panel according to claim 7, wherein the display panel further has a plurality of nanogrooves disposed on a side of at least one of the metal wires.

11. A display device, comprising:
a display panel, comprising:
- a first substrate and a second substrate disposed opposite to the first substrate, wherein the first substrate has a display region and a non-display region located outside the display region;
- at least a data line and at least a scan line disposed in the display region;
- a liquid crystal layer disposed between the first substrate and the second substrate;
- a plurality of spacers disposed on the first substrate or on the second substrate;
- a seal disposed between the first substrate and the second substrate;
- a light shielding layer disposed on the first substrate or on the second substrate, and comprising a light transmitting portion and a light shielding portion; and
- an alignment layer and a plurality of particles disposed on the light transmitting portion and the light shielding portion;
wherein a first surface roughness corresponding to the light transmitting portion of the non-display region is greater than a second surface roughness corresponding to the light shielding portion of the non-display region.

12. The display device according to claim 11, wherein the distribution density of the particles having a size of 10-100 nm located in the non-display region is greater than the distribution density of those located in the display region.

13. The display device according to claim 11, wherein the distribution density of the particles located in the non-display region having a size of 10-50 nm is greater than the distribution density of those having a size of 50-100 nm.

14. The display device according to claim 11, wherein the seal has a first width and a first sidewall, the first sidewall is adjacent to the non-display region, and the distribution density of the particles located on the second substrate within a range starting from the first sidewall to less than one time the first width away from the first sidewall is different from the distribution density of those within a range starting from greater than one time the first width to less than three times the first width away from the first sidewall.

15. The display device according to claim 11, wherein the first surface roughness is greater than a third surface roughness generated from the particles on the light transmitting portion of the display region of the first substrate.

16. The display device according to claim 11, wherein the distribution density of the particles having a size of 50-100 nm located in the non-display region on the first substrate is lower than the distribution density of those on the second substrate.

17. The display device according to claim 11, further comprising:
- a plurality of thin film transistors disposed on the first substrate;
- a plurality of metal wires disposed on the first substrate; and
- a protection layer overlaying at least a portion of the metal wires
wherein the alignment layer is disposed on the protection layer for exposing a first surface of the protection layer; and the particles are disposed on at least a portion of the first surface.

18. The display device according to claim 17, wherein the protection layer is in direct contact with at least one of the thin film transistors or the metal wires.

19. The display device according to claim 17, wherein the protection layer comprises an inorganic dielectric material.

20. The display device according to claim 17, wherein the display panel further has a plurality of nanogrooves disposed on a side of at least one of the metal wires.

* * * * *